No. 870,227.

PATENTED NOV. 5, 1907.

W. CRONK.
RAKE.
APPLICATION FILED APR. 10, 1907.

WITNESSES:
L. V. Stoeltzlen
M. E. Verbeck.

INVENTOR
William Cronk
BY
Eugene Diven
ATTORNEY

UNITED STATES PATENT OFFICE.

WILLIAM CRONK, OF MONTOUR FALLS, NEW YORK.

RAKE.

No. 870,227.  Specification of Letters Patent.  Patented Nov. 5, 1907.

Application filed April 10, 1907. Serial No. 367,428.

*To all whom it may concern:*

Be it known that I, WILLIAM CRONK, a citizen of the United States, residing at Montour Falls, in the county of Schuyler and State of New York, have invented certain new and useful Improvements in Rakes, of which the following is a specification.

This invention relates to an improvement in cleaning attachments for hand rakes, and more especially for those adapted for lawn and garden work; my object being to provide an attachment of this kind which may be manufactured at a low cost and adapted to be readily applied to or removed from the metal rakes now in common use; and which will be strong and durable, and effective in operation.

I attain my object by constructing the attachment in the manner illustrated in the accompanying drawings, in which—

Figure 1:
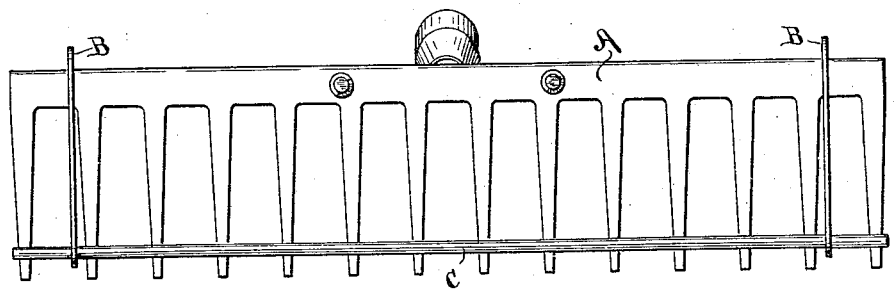
Figure 2:
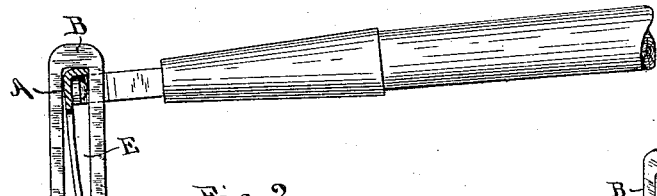
Figure 3:
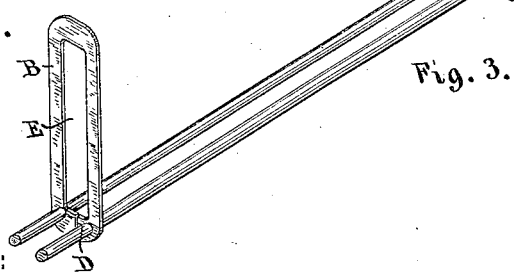

Figure 1 represents a front elevation of a rake with my attachment applied thereto; Fig. 2, a side view showing the outer end of the rake in section; Fig. 3, a perspective view of the attachment removed from the rake; and Fig. 4, a detail showing a modified form of the attachment.

Like letters of reference designate like parts in the several views.

The rake herein shown consists of a head A flanged at the top and having teeth projecting from the lower edge in the usual manner. The cleaning attachment consists of two vertical metal retainer plates B, set transversely to the rake head, and having two bars C run through and fastened to the lower ends thereof by upsetting the bars at each side of the plates, or otherwise securing them in place. The lower ends of the plates are cut through at D, and the plates are slotted out above said cuts at E, said slots being of sufficient width to permit the plates to slide freely up and down on the head A.

To place the attachment upon a rake, the plates B are sprung apart sufficiently to permit them to be slipped past the teeth of the rake, the plates being placed in position first at one end of the rake and then at the other. When once in place the attachment cannot be easily removed from the rake, because the plates B, being set transversely, cannot be easily sprung apart at their lower ends. The two parallel bars ride easily up and down upon the teeth, and are of sufficient weight to act effectively in removing grass, twigs, stones and the like caught in the teeth when the rake is in use.

Figure 4:
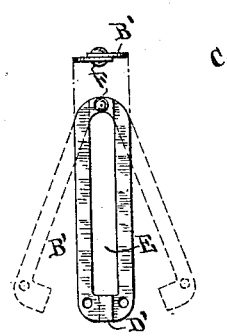

Instead of making the retainer plates B in one piece, I may make them in two parts, overlapping and riveting the members together at one end of the slot, as shown at F in Fig. 4, thereby forming a stiff hinge joint which permits the opposite end to be opened when applying the attachment to a rake, the members at said opposite end having projections which close the slot, and which may be overlapped as at B' to lock them more securely on the rake. This form of the attachment is more easily applied to and removed from the rake, but is not so securely locked thereon.

What I claim and desire to secure by Letters Patent is—

1. A cleaning attachment for rakes comprising two slotted retainer plates constructed to be hung edgewise upon a rake head intermediate the ends thereof, and a pair of parallel bars run through and fastened to the lower ends of said plates.

2. A cleaning attachment for rakes comprising two slotted retainer plates, each cut through at the lower end into its slot, and a pair of parallel bars fastened to said plates at opposite sides of the cuts.

3. A cleaning attachment for rakes comprising two slotted retainer plates, each plate being composed of two members hinged together at one end and provided with projections at the opposite end to close the slot, and a pair of parallel bars fastened to said plates at their lower ends.

In testimony whereof I have affixed my signature, in presence of two witnesses.

WILLIAM CRONK.

Witnesses:
 W. D. BOWLBY,
 C. F. CARRIER.